United States Patent [19]

Vitkuske et al.

[11] Patent Number: 4,847,326

[45] Date of Patent: Jul. 11, 1989

[54] COPOLYMER BLENDS

[75] Inventors: John F. Vitkuske; Corwin J. Bredeweg, both of Midland, Mich.

[73] Assignee: The Dow Chemical Company, Midland, Mich.

[21] Appl. No.: 810,488

[22] Filed: Dec. 19, 1985

[51] Int. Cl.$^4$ .................. C08L 53/02; C08L 25/16; C08L 23/12; C08L 23/06

[52] U.S. Cl. .................................. 525/89; 525/98

[58] Field of Search ......................... 525/89

[56] References Cited

U.S. PATENT DOCUMENTS

| | | | |
|---|---|---|---|
| 3,980,736 | 9/1976 | Agouri et al. | 525/89 |
| 4,031,166 | 6/1977 | Bronstert et al. | 260/876 B |
| 4,039,629 | 8/1977 | Himes et al. | 525/89 |
| 4,267,283 | 5/1981 | Whitehead | 525/89 |
| 4,302,554 | 11/1981 | Nabeta et al. | 525/89 |
| 4,386,187 | 5/1983 | Groncio et al. | 525/96 |
| 4,391,927 | 7/1983 | Farmer | 525/89 |
| 4,495,323 | 1/1985 | Collins | 525/89 |

*Primary Examiner*—Carman J. Seccuro
*Attorney, Agent, or Firm*—Douglas N. Deline

[57] ABSTRACT

Novel copolymer blends comprising (a) a copolymer of alkenyl aromatic monomers containing from about 10 to about 70 percent by weight of an isopropenyl aromatic monomer, (b) a block copolymer having an alkenyl aromatic monomer blocks and polybutadiene blocks containing from about 10 to about 70 percent by weight isopropenyl aromatic monomer in the alkenyl aromatic block and from about 15 to about 50 weight percent butadiene, (c) a block copolymer having alkenyl aromatic monomer blocks and polybutadiene blocks containing from about 10 to about 70 percent by weight isopropenyl aromatic monomer in the alkenyl aromatic monomer and from about 55 to about 80 weight percent butadiene, and (d) a polyolefin.

14 Claims, No Drawings

COPOLYMER BLENDS

Alkenyl aromatic resins have found wide applications in commerce. Such resins have been found to be useful for injection molding, extrusion into shaped bodies, film preparation and the like. Generally, alkenyl aromatic resins tend to be rigid and oftentimes brittle. The problem of brittleness in the resins has been overcome to some degree by the addition of diene polymers such as synthetic and natural rubbers. Polymer blends of alkenyl aromatic resins and diene polymers have been prepared from a variety of methods including mechanical blending and mass polymerization of the alkenyl aromatic monomer in the presence of the diene rubber. Blends have also been prepared by emulsion polymerization techniques. Blends or mixtures of alkenyl aromatic resinous polymers and diene polymers generally exhibit reduced tensile strength over that of the alkenyl aromatic resin alone. However, their toughness or resistance to impact is generally substantially increased. The level of diene polymer employed therein is approximately 5 weight percent to about 25 weight percent of the total mixture. A plurality of block copolymers have been prepared generally possessing the configuration $AB(BA)_n$ wherein n is from about 0 to 5 inclusive, and A represents a block of alkenyl aromatic monomer and B represents a block of a polymer of one or more conjugated dienes. The transition from the A block to the B block may be abrupt or may constitute a polymer of gradually changing composition wherein the A block adjacent the B block may continuously vary in composition from a copolymer relatively high in alkenyl aromatic monomer to a copolymer of high diene content. Such polymers are generally referred to as graded or tapered block copolymers. Block copolymers may vary in physical characteristics from a thermoplastic elastomer to a relatively rigid resinous material depending upon the proportion of the diene monomer polymerized therein. A wide variety of toughened alkenyl aromatic resinous compositions have been prepared by incorporating block copolymers primarily of the AB or ABA configuration into a matrix of an alkenyl aromatic resinous polymer. Such polymer blends may be prepared by a variety of methods including the polymerization of the alkenyl aromatic monomer in the presence of the block copolymer in suspension or alternatively by mechanical blending of such polymers. Generally, such block copolymers are more readily dispersed in the alkenyl aromatic resinous matrix than are homopolymers of the diene.

For many applications such alkenyl aromatic resinous polymer-diene polymer blends including graft copolymers have been prepared with the goal of obtaining a maximum functional physical properties balance. Generally, such a balance which is desirable results in the polymer having a high tensile strength and excellent physical toughness and a high heat distortion temperature. In the preparation of most blends, as the diene content of the blend is increased, the toughness also increases. However, as the toughness of the product or impact strength increases generally the tensile strength and heat distortion temperature substantially and significantly decreases. The ultimate desired product has been facetiously described by many who work in the field as a transparent stainless steel. The desired physical properties in any such diene polymer reinforced-alkenyl aromatic resinous composition will vary depending upon the end use application desired. For example, a combination of high toughness and tensile strength is desirable in a machine housing such as a radio cabinet, calculator housing or the like.

In addition, in some applications involving contact with fats, oils or other chemical agents such as hydrocarbons and halocarbons, alkenyl aromatic resins are adversely affected and exhibit reduced impact resistance. This property known as environmental stress crack resistance is particularly desirable in containers for use in food, dairy and petroleum products. While environmental stress crack resistance is known to be improved by blending of a polyolefin with an alkenyl aromatic resin, such blends in the past have entailed a concomitant loss of other desirable properties. In particular, tensile strength, tensile modulus and creep resistance are normally adversely affected by the presence of a polyolefin resin.

Because of the widely varying requirements of impact resistance, environmental stress crack resistance and toughness in resinous products which might be prepared from a variety of preformed polymers, it would be desirable if such compositions could be prepared without the necessity of special polymerization techniques for the preparation of polymer blends having the desired physical properties for a given end use application.

Furthermore, it would be desirable if there were available synthetic resinous blends exhibiting high heat distortion temperatures and if such blends were readily capable of preparation by conventional processing techniques.

It would also be desirable if such blends exhibited a high degree of toughness and impact resistance.

It would also be desirable if there were available blends of polymeric material suitable for food containers which are processed at elevated temperatures.

Finally, it would be desirable to provide a copolymer blend of an alkenyl aromatic resin demonstrating improved environmental stress crack resistance without loss of a significant amount of tensile modulus, tensile strength and creep resistance.

SUMMARY OF THE INVENTION

In accordance with the present invention there is now provided a copolymer blend comprising:

(a) from 40 to 75 weight percent of a copolymer of two or more alkenyl aromatic monomers of the formula:

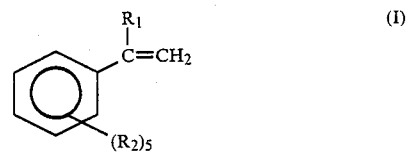

wherein $R_1$ is hydrogen or methyl; and $R_2$ independently each occurrence is hydrogen or methyl provided that the copolymer contains from about 10 to about 70 weight percent of an isopropenyl monomer of formula I, (b) from 5 to 30 weight percent of a block copolymer of the configuration $AB(BA)n$, wherein n is an integer from about 1 to 5 and A represents a copolymer of monomers of (I) wherein from about 10 to 70 weight percent of the A blocks comprise an isopropenyl aromatic monomer of formula (I), and B represents a polymer of one or more polymerizable conjugated dienes, and B is from about 15 to 50 weight percent of the block copolymer.

(c) from 5 to 30 weight percent of a second block copolymer of the configuration CD(DC)m, wherein m is an integer from 1 to 5, and C is a copolymer of monomers of formula (I) provided that from about 10 to 70 weight percent of the C block is an isopropenyl aromatic monomer, and D represents a polymer of one or more polymerizable conjugated dienes, the D component being from about 55 to about 80 weight percent of the second block copolymer; and (d) from 15 to 50 weight percent of a semicrystalline polyolefin.

DETAILED DESCRIPTION OF THE INVENTION

Copolymers of alkenyl aromatic monomers useful for the practice of the present invention are readily prepared by methods well known in the art. The copolymers useful in the present invention include in copolymerized form 2 or more monomers such as styrene, alpha-methylstyrene, paramethylstyrene, paramethylalphamethylstyrene and the like. Polymerization of mixtures of such monomers is readily accomplished by mass polymerization, suspension polymerization, emulsion polymerization or solution polymerization utilizing either thermal initiation, free radical initiation or anionic initiation. Preferably such copolymers contain from about 50 to about 70 weight percent of polymerized isopropenyl monomer of formula I.

Copolymers useful in the practice of the present invention preferably have a weight average molecular weight determined by gel permeation chromatography of from about 60,000 to about 200,000 grams per mole, and beneficially from about 80,000 to about 120,000 grams per mole. Preferred copolymers are styrene-alpha-methylstyrene copolymers. Most preferred are such copolymers prepared by anionic polymerization at a temperature above the ceiling temperature of alpha-methylstyrene, i.e. above 61° C.

On heat plastification, copolymers within the lower molecular weight range or lower than the desired molecular weight range, exhibit a highly desirable degree of fluidity on being heat plastified. However, such low molecular weight components frequently are of relatively low impact and tensile strength and tend to be somewhat brittle. Conversely, high molecular weight copolymers oftentimes exhibit a higher viscosity when heat plastified compared to lower molecular weight copolymers. In such compositions plasticizing agents may additionally be incorporated in order to retain desirable lower viscosity melted compositions.

Block copolymers for the practice of the present invention are most readily prepared by the use of anionic initiation techniques, are well known in the art, and are typified in the processes set forth in the following U.S. Pat. Nos. 2,975,160; 3,031,432; 3,231,635; 3,238,173; 3,242,038; 3,251,905; 3,390,207; 3,465,065; 3,507,934; 3,598,557; 3,632,682; 4,089,913; 4,104,331; 4,104,332; 4,122,134; 4,196,153; 4,196,154; 4,205,016; 4,219,627; 4,427,837; 4,431,777; and 4,525,532, the teachings of which are herewith incorporated by reference thereto. Such methods include the sequential polymerization of the block copolymer, employing a monofunctional catalyst for example, n-butyllithium, wherein either the A (or C) block or the B (or D) block may be polymerized in the absence of the other desired monomer or monomers. When the polymerization of one block is generally complete, monomer for the formation of the additional block is added to the linear polymer to form a block of the so-called AB configuration which is terminated by a lithium atom. Subsequent addition of more monomer will serve to either increase the length of one block or provide a block of different composition depending upon the monomer added to the reaction mixture. Different block copolymers can be prepared by initiating polymerization in the presence of both a diene monomer and an alkenyl aromatic monomer wherein the diene monomer is more reactive and polymerizes first an initial block consisting of a majority of conjugated diene units polymerized therein. As the concentration of diene monomer decreases, increasing proportions of the alkenyl aromatic monomer are incorporated within the molecule. When the supply of diene monomer is diminished, the proportion of alkenyl aromatic monomer polymerized in the block increases and provides what in essence may be considered a homopolymer or diene free alkenyl aromatic block. Employing a multifunctional initiator, the diene component may be first polymerized to provide diene polymer having two or more living ends. On polymerization of the diene monomer, alkenyl aromatic monomer may be added to form terminal blocks of the A (or C) configuration. This later procedure is the preferred technique for preparation of the block copolymers used in the invention.

An alternative method for the preparation of block copolymers useful in the practice of the present invention is the so-called coupling technique, wherein living polymers of AB (or CD) configuration are prepared having, for example, a lithium atom terminating the B (or D) block remote from the A (or C) block and contacting with a solution of the living polymer, a multifunctional active substance or coupling agent. Suitable coupling agents are well known in the art and may have from 2 to 6 or more active sites. In the event that the B (or D) block of an AB (or CD) block copolymer is terminated by an active moiety, such as a lithium atom in combination with a coupling agent having three or more active sites, such as carbon tetrachloride, a majority of the product generally results in a so-called star block copolymer of the formula $AB(BA)_n$ (or CD(DC)m), wherein m or n is greater than 2. Depending on the particular coupling agent utilized, n (or m) is readily varied between integral values from 1 to 5 inclusive. Beneficially, the isopropenyl aromatic monomer comprises from about 50 to 65 weight percent of the A or C block total weight. Block copolymers useful in the pactice of the present invention have weight average molecular weights as determined by gel permeation chromatography of from about 60,000 to 200,000 grams per mole and beneficially from about 80,000 to 120,000. Most preferably, the block copolymers are linear copolymers, i.e., m or n is equal to one.

Semicrystalline polyolefins suitable for the practice of the present invention include polymers of ethylene, propylene and like olefin compounds either as homopolymers or interpolymers. By the term semicrystalline is meant that the compositions demonstrate a minimum of at least 10 percent crystallinity. Preferred polyolefin polymers exhibit a melting point of at least 70° C. Most preferred polyolefins are high density polyethylene having a melt index (ASTM D1238-82, schedule E) of 0.5 to 20 and polypropylene, having a melt index (ASTM D1238-82, schedule L) of 2.0–25.

Blends in accordance with the present invention are readily prepared employing any one or more of several methods including mixing of the blend components when the blend components are in a heat plastified state. The mixing may be accomplished by any of a variety of mechanical mixing devices including single screw extruders, twin screw extruders, compounding rolls and other similar malaxating devices adapted to receive plastified synthetic resinous material and provide a desired degree of mixing or to receive such polymeric materials, heat plastify and mix them. In addition, blending of the various polymeric components can be achieved using solution blending techniques wherein the components are mixed in an inert solvent and the solvent is subsequently removed by evaporation or a like technique.

Various additives may additionally be incorporated into the copolymers according to known techniques. Examples of suitable additives include antioxidants, processing aids, colorants, fillers, reinforcing agents, stabilizers, pigments, antiblocking additives, blowing agents, etc.

Blending is continued until a suitably homogeneous product is achieved. The resulting product is normally characterized in that the block copolymers are in anisotropic form, typified by platlet or "stringy" shape depending on the shear conditions.

The present invention is illustrated by, but not limited to the following examples. Percentages and parts are expressed as weight measurements.

EXAMPLE 1

A blend is prepared from pelletized resins by tumbling the various components in a polyethylene bag. Component (a) comprises 12.4 pounds, 46.5 percent, of a styrene/alpha-methylstyrene copolymer containing approximately 60 percent alpha-methylstyrene having a weight average molecular weight of 94,000 grams per mole and a melt flow rate measured in accordance with ASTM D1238-82, schedule I of 2.0. The copolymer prepared by anionic polymerization at a temperature of about 85° C. Component (b) comprised 2 pounds, 7.5 percent, of an ABA block copolymer wherein the A portion comprised a 40/60 copolymer of styrene and alpha-methylstyrene. The B block comprised polybutadiene. Polybutadiene content of component (b) is about 30 percent. Component (b) has a weight average molecular weight of 95,000 grams per mole and a melt flow rate in accordance with the ASTM D1238-82, condition G of 7.0. Component (c) comprises 5.7 lbs, is 21.5 percent, of an ABA block copolymer wherein the A blocks are a 40/60 copolymer of styrene and alpha-methylstyrene and the B block is polybutadiene. The polybutadiene block is about 60 weight percent of the ABA copolymer which has a weight average molecular weight of 96,000 grams per mole and a melt flow rate under condition G of 1.5 as determined in accordance with the ASTM designation D1238-82. Component (d) is 6.7 pounds or 25 percent of polypropylene having a melt index of 12 as measured under condition L in accordance with the ASTM designation D1238-82. Also included in the blend is 46 grams or 0.5 percent of tris(3,5-di-t-butyl-4-hydroxybenzyl)isocyanurate commercially available under the trade designation of Good-rite ® 3114 and 23 grams of 0.25 weight percent of (tetrakis[2,4-di-tert-butylphenyl]4,4'-biphenylylenediphosphonite) commercially available under the trade designation of Sandostab P-EPQ. The dry mix is melt blended in a Werner-Pfleiderer ZSK-30 twin screw extruder having 3 conveying and 3 mixing zones. The temperature setting of all zones is 230° F. The melt temperature of the mix increases from about 210° F. in the feed zone to 220° F. in the die. The feed rate of the dry mixture to the extruder is about 12 pounds per hour. The screw speed is 275 revolutions per minute. The optimum screw speed is determined by observing the mixing and forwarding of the material through an observation port and observing the texture of a strand of the blend from the die. The extruded strand is passed through a water bath and pelletized to provide pellets about ⅛ inch in length.

EXAMPLE 2

The foregoing example is repeated with the exception that the polypropylene is omitted and the extruder screw speed decreased to 200 revolutions per minute. It is noted that the mixture without the polypropylene requires about 45 percent more torque applied to the screws than the blend containing polypropylene. The blend containing polypropylene is designated as blend A and the blend without polypropylene is designated as blend B. Each blend is injection molded into test bars and the physical properties determined. The physical properties are set forth in Table I.

TABLE I

| # | MFR[1] | Heat Distortion[2] | | Tensile Strength | | |
|---|---|---|---|---|---|---|
| | | Vicat °C. | DTUL °C. | Tr psi | Ty psi | Tm psi |
| A | 4.1 | 137 | 121 | 4150 | 4800 | 3.1 |
| B | 3.0 | 133 | 121 | 3500 | 4900 | 3.2 |

| | Elongation (%) | Izod Impact[3] | ESCR (minutes)[4] |
|---|---|---|---|
| A | 1.2 | 1.2 | 5520 |
| B | 0.9 | 0.9 | 335 |

[1]MFR = melt flow rate of schedule I in accordance with ASTM D1238-82.
[2]Vicat = Heat distortion as given in degrees Centigrade.
DTUL = distortion temperature under load ASTM D-648-56.
[3]ft.lbs/inch notched specimen, room temp.
[4]environmental stress crack resistance using 50/50 mixture of cottonseed oil/oleic acid substantially according to the procedure of R. A. Bubeck et al., Polymer Eng. Sci., 21,624 (1981).

The blends A and B are also extruded using a 12-inch Nelmor sheet extruder to form a 50 mil sheet. The extrusion rate for each sample is 50±5 pounds per hour. With the A blend containing polypropylene, the motor driving the extruder requires 5 amperes of electricity, while the sample without the polypropylene requires 5.5 amperes. The extruded sheet of both blends is vacuum formed to produce 8 ounce containers that are filled with water at a temperature of 90° C. The containers are closed by clamping an aluminum cover on the open mouth of each container. Containers from each blend are subjected to 250° F. atmosphere in a sterilizer. No distortion is observed for containers of either blend. The containers are subsequently cooled to ambient temperature and dropped 6 feet onto a concrete floor. Four of six containers from blend A retain all of their contents. All of the containers of blend B tested ruptured and lost at least part of their contents.

EXAMPLE 3

A dry mixture is prepared by dry mixing the following listed components. Component (a) is 10 pounds of a 38/62 styrene-alpha-methylstyrene copolymer having a weight average molecular weight as determined by gel permeation chromatography of 88,000 grams per mole prepared by anionic polymerization at a temperature of about 85° C. The copolymer has a melt flow rate of 1 employing condition I of ASTM D1238-82. Component (b) is 2.5 pounds of ABA block copolymer wherein the B block is polybutadiene (38% of the ABA block copolymer weight) and the A blocks are 40/60 styrene-alpha-methylstyrene copolymer blocks. The molecular weight is 95,000 grams per mole as determined by gel permeation chromatography. Component (b) has a melt flow rate of 7.0 under condition G of the ASTM designation 1238-82. Component (c) is 2.5 pounds of an ABA block copolymer wherein the B block is polybutadiene (63%) and the A blocks are 40/60 styrene-alpha-methylstyrene copolymer blocks. The polymer has a molecular weight of 95,000 grams per mole as determined by gel permeation chromatography and a melt flow rate of 4.0 under condition G of the ASTM designation D1238-82. Component (d) is 5 pounds of high density polyethylene (HDPE 12065, available from The Dow Chemical Company) having a melt index of 1.0 under schedule E. Also added to the mixture is 34 grams of (Goodrite® 3114 as a heat stabilizer, and 13.5 grams of the tetrakis[2,4-di-tert-butylphenyl]4,4'-biphenylenediphosphonite. This mixture is designated as mixture C.

A second mixture, designated D, is prepared in a similar manner but the polyethylene is omitted. Each mixture is melt blended as in Example I with the exception that the extruder temperature is 225° F. Mixture C uses a screw speed of 200 revolutions per minute and mixture D uses a screw speed of 150 revolutions per minute.

After injection molding, the following results are obtained:

| # | MFR | Vicat | DTUL | Tr | Tm | % E | Izod Impact | ESCR |
|---|-----|-------|------|------|-----|-----|-------------|------|
| C | 5.2 | 135 | 118 | 5000 | 2.7 | 18 | 0.7 | 2862 |
| D | 4.7 | 140 | 125 | 5300 | 3.5 | 1.6 | 0.5 | 46 |

Containers fabricated from mixture C are drop tested as in Example 2. Two of the four containers prepared from mixture C pass the drop test while none of the containers prepared from mixture D passed.

In a similar manner, other highly desirable blends are readily prepared.

What is claimed is:

1. A copolymer blend exhibiting high heat distortion temperatures and improved environmental stress crack resistance (ESCR) comprising:
   (a) from 40 to 75 weight percent of a copolymer consisting essentially of of two or more alkenyl aromatic monomers of the formula:

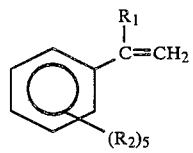

wherein $R_1$ is hydrogen or methyl; and $R_2$ independently each occurrence is hydrogen or methyl provided that the copolymer contains from about 10 to about 70 weight percent of an isopropenyl monomer of formula I;
   (b) from 5 to 30 weight percent of a block copolymer of the configuration AB(BA)n, wherein n is an integer from about 1 to 5 and A represents a copolymer of monomers of formula (I) wherein from about 10 to 70 weight percent of the A blocks comprise an isopropenyl aromatic monomer of formula (I), and B represents a polymer of one or more polymerizable conjugated dienes, and B is from about 15 to 50 weight percent of the block copolymer;
   (c) from 5 to 30 weight percent of a second block copolymer of the configuration CD(DC)m, wherein m is an integer from 1 to 5, and C is a copolymer of monomers of formula (I) provided that from about 10 to 70 weight percent of the C block is an isopropenyl aromatic monomer, and D represents a polymer of one or more polymerizable conjugated dienes, the D component being from about 55 to about 80 weight percent of the second block copolymer; and
   (d) from 15 to 50 weight percent of a semicrystalline polyolefin said copolymer blend characterized in that the environmental stress crack resistance (ESCR) thereof is greater than the environmental stress crack resistance of a similar blend containing only components (a), (b) and (c).

2. A copolymer blend according to claim 1, wherein component (a) is a copolymer of styrene and alpha-methylstyrene.

3. A copolymer blend according to claim 2, wherein the copolymer of styrene and alpha-methylstyrene is prepared by anionic polymerization at a temperature above the ceiling temperature of alpha-methylstyrene.

4. A copolymer blend according to claim 1, wherein component (a) has a weight average molecular weight of from about 60,000 to about 200,000 grams/mole.

5. A copolymer blend according to claim 4, wherein component (a) has a weight average molecular weight of from about 80,000 to about 120,000 grams/mole.

6. A copolymer blend according to claim 1, wherein block copolymers (b) and (c) have weight average molecular weights from about 60,000 to about 150,000 grams/mole.

7. A copolymer blend according to claim 1, wherein block copolymers (b) and (c) have weight average molecular weights from about 80,000 to about 120,000 grams/mole.

8. A copolymer blend according to claim 1, wherein component (d) is high density polyethylene having a melt index according to ASTM D1238-82, schedule E of 0.5 to 20 or polypropylene having a melt index according to ASTM D1238-82, schedule L of 2.0–25.

9. A copolymer blend according to claim 1, wherein component (a) contains from about 50 to about 70 weight percent of an isopropenyl monomer of formula I.

10. A copolymer blend according to claim 1, wherein in component (b) A represents a copolymer of monomers of formula I wherein from about 50 to about 65 weight percent of the A block comprises an isopropenyl aromatic monomer of formula I.

11. A copolymer blend according to claim 1, wherein in component (c) C represents a copolymer of monomers of formula I wherein from about 50 to about 65 weight percent of the C block comprises an isopropenyl aromatic monomer of formula I.

12. A blend according to claim 1 having an ESCR of at least 2862 minutes.

13. A blend according to claim 1 having a DTUL of at least 118° C.

14. A blend according to claim 1 wherein the ESCR is at least 28 times greater than a similar blend containing only components (a), (b) and (c).

* * * * *

UNITED STATES PATENT AND TRADEMARK OFFICE
CERTIFICATE OF CORRECTION

PATENT NO. : 4,847,326

DATED : July 11, 1989

INVENTOR(S) : John F. Vitkuske and Corwin J. Bredeweg

It is certified that error appears in the above-identified patent and that said Letters Patent is hereby corrected as shown below:

Column 4, line 52, "pactice" should correctly appear as --practice--.

Column 6, line 35, Table I "5520" should correctly appear as --9520--.

Column 7, line 49, delete the first appearance of "of".

Signed and Sealed this

Fourth Day of June, 1991

Attest:

HARRY F. MANBECK, JR.

Attesting Officer

Commissioner of Patents and Trademarks